US006437791B1

United States Patent
Hopkins

(10) Patent No.: US 6,437,791 B1
(45) Date of Patent: Aug. 20, 2002

(54) METHOD AND APPARATUS FOR SUPPORTING TEXTURE PATTERNS LARGER THAN SUPPORTED NATIVELY BY A GRAPHICS CHIP

(75) Inventor: Doug Hopkins, Ellisville, MO (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/391,300

(22) Filed: Sep. 7, 1999

Related U.S. Application Data

(60) Provisional application No. 60/138,920, filed on Jun. 11, 1999.

(51) Int. Cl.[7] .............................................. G06T 15/50
(52) U.S. Cl. ....................... 345/582; 345/423; 345/583; 345/587
(58) Field of Search .................. 345/430, 581, 345/582, 586, 588, 647, 418, 419, 423, 427, 583, 587, 620, 501, 502, 503, 552, 557, 566; 711/118; 382/166

(56) References Cited

U.S. PATENT DOCUMENTS

| | | | | |
|---|---|---|---|---|
| 5,194,969 A | * | 3/1993 | DiFrancesco | 358/463 |
| 5,361,386 A | * | 11/1994 | Watkins | 395/130 |
| 5,664,071 A | * | 9/1997 | Nagashima | 345/423 |
| 5,751,293 A | * | 5/1998 | Hashimoto | 345/430 |
| 5,835,096 A | * | 11/1998 | Baldwin | 345/430 |
| 5,987,567 A | * | 11/1999 | Rivard | 711/118 |
| 6,121,975 A | * | 9/2000 | Mungenast | 345/430 |
| 6,125,201 A | * | 9/2000 | Zador | 382/166 |
| 6,226,005 B1 | * | 5/2001 | Laferriere | 345/422 |
| 6,232,981 B1 | * | 5/2001 | Gossett | 345/586 |
| 6,239,808 B1 | * | 5/2001 | Kirk | 345/430 |
| 6,333,746 B1 | * | 12/2001 | Vaswani et al. | 345/582 |
| 6,342,884 B1 | * | 1/2002 | Kamen et al. | 345/423 |

FOREIGN PATENT DOCUMENTS

| | | | | |
|---|---|---|---|---|
| EP | 0560942 B1 | * | 12/1997 | H04N/1/38 |
| FR | 2674973 | * | 10/1992 | |
| JP | 2000030081 | * | 7/1998 | G06T/15/00 |

* cited by examiner

*Primary Examiner*—Matthew Luu
(74) *Attorney, Agent, or Firm*—Townsend and Townsend and Crew LLP

(57) ABSTRACT

A system and method for supporting texture patterns larger than natively supported by a graphics processor divides the texture pattern into quadrants and then decomposes object triangles into clipped triangles that fit completely within the quadrants.

4 Claims, 5 Drawing Sheets

METHOD AND APPARATUS FOR SUPPORTING TEXTURE PATTERNS LARGER THAN SUPPORTED NATIVELY BY A GRAPHICS CHIP

CROSS-REFERENCE TO RELATED APPLICATION

This application claims priority from provisional application No. 60/138,920, filed Jun. 11, 1999, the disclosure of which is incorporated herein by reference.

BACKGROUND OF THE INVENTION

As is known in the art, the basic building block of a 3D graphics chip is a triangle. All objects can be defined as a set of 3D triangles connected together to form complex objects. (A square is made up of 2 triangles; a cube is composed of 12 triangles; and a sphere may be composed of 50–100 triangles.) Now that these triangles have formed the basic shape of the object, the triangle interior must be filled in to give the object its form. The triangle may be filled in as a solid color, shaded to give a gradual change in color across the triangle, or filled in with a predefined pattern. The most complex of these "triangle fill" methods is known as texturing. Texturing is a capability that allows a 2D image/picture to be used to fill the triangle. A simple example is a brick wall. On one hand, this wall could be constructed by hundreds of triangles forming the complex details of the wall, but, on the other hand, a picture of a brick wall could be pasted on a square (two triangles) to obtain the same, if not better, resultant image. Because of the power of texturing, this method has become the cornerstone of 3D graphics programming during the past 10–15 years.

Each distinct image (known as a texture pattern) is defined with a size, the height and width of the image. Texture patterns (for reasons that are not important to this discussion) are defined in size known as the "Powers of 2". The smallest texture pattern is 1×1 and increases upwards to 2×2, 4×4, 8×8, 16×16, etc (the powers of 2 are 1, 2, 4, 8, 16, 32, 64, 128, 256, 512, 1024, 2048, and so forth).

Unfortunately, when designing a physical graphics chip, the hardware must have certain limits placed on it. One of these limits is the maximum texture pattern size that can be supported. The goal of hardware developers is to keep this limit ahead of what software developers desire to use, and, of course, this is not always the case.

In today's environment, there are several major developers of 3D graphics chips. NVIDIA™ builds a line of chips that has a limit of 2048×2048 for the Maximum Texture Pattern™; S3™ builds a line of chips that has a limit of 2048×2048; and 3DfX™ builds the Voodoo™ line of chips which are limited to only 256×256. In the market today, there are games (namely Quake3™ from id Software) that are starting to use texture patterns at a size of 512×512.

SUMMARY OF THE INVENTION

According to one aspect of the invention, a software technique allows larger texture patterns to be managed on graphics chips that do not support the large patterns directly in hardware.

A large texture pattern is divided into several quadrants according to a Powers of 2 technique. If an object triangle does not completely fit within a triangle is decomposed into clipped triangles, each of which completely fits within a quadrant.

According to another aspect of the invention, the process recursively decomposes an object triangle by looking for quadrant crossings along the edges of the triangle.

According to a still further aspect of the invention, for a given triangle vertex, double crossings of both sides from a vertex are processed first. Single crossings are implemented second.

According to a still further aspect of the invention, a system including a CPU, graphics card, and display implements program code to implement the process to allow graphics chips on the card to support larger texture patterns than can be handled by the hardware of the chip.

Additional features and advantages will be apparent in view of the following detailed description and appended drawings.

DESCRIPTION OF THE SPECIFIC EMBODIMENTS

All texture patterns are required to fit within the "Power of 2" size format.

As a result of this, the following equation holds true.

$$2^N = 2 * 2^{N-1}$$

$$2^N * 2^N = 2 * 2^{N-1} * 2^{N-1}$$

$$2^N * 2^N = 4 * 2^{N-1} * 2^{N-1}$$

All large texture patterns can be broken down into four distinct texture patterns of the next smaller size (i.e. a 1024×1024 pattern may be represented by 4— 512×512 patterns). Additionally, this relationship holds true in a repetitive fashion as well. A 1024×1024 pattern may be represented by 4—512×512 patterns—and each 512×512 pattern can be represented by 4—256×256 patterns, and so on. Or in other words, a 1024×1024 pattern can be directly represented by 16—256×256 patterns.

Using this information, in a preferred embodiment, the first step in the technique is sub-divide all large texture patterns (patterns larger than natively supported in hardware) into smaller patterns that fit into the hardware. Continuing on with the above example and using a graphics chip that has a maximum limit of a 256×256 pattern— a 512×512 pattern would be divided into 4—256×256 patterns, a 1024×1024 pattern would be divided into 16—256×256 patterns, and so forth.

After this is accomplished, the second (and most difficult) step of the process is performed.

Figure 1:
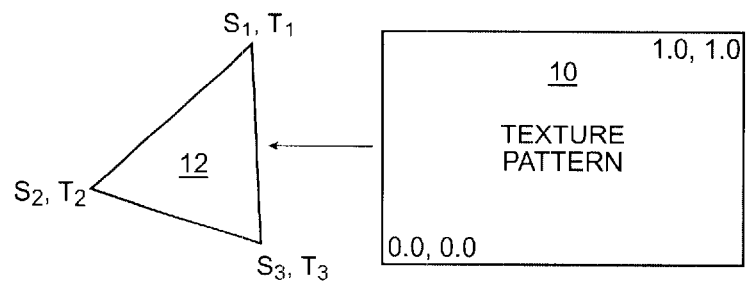
FIG. 1 is a diagram depicting the coordinate mapping from a texture to a triangle.

This second step of the technique is the decomposing (or clipping) of triangles into smaller pieces that each fit into a smaller texture pattern. When a software developer requests to draw a textured triangle—he specifies some additional information with the triangle. Because of a triangle's shape, the triangle does not cover all of the texture pattern. FIG. 1 depicts the mapping of coordinates from a texture to a triangle. A texture pattern 10 is represented such that the lower-left corner of the pattern is represented by the coordinate (0.0, 0.0) and the upper-right corner of the pattern is represented by the coordinate (1.0, 1.0). Any value within the range of zero to one inclusive will represent a location directly on the texture pattern. This is the method the software developer uses to apply an image to a triangle. Each vertex (corner) of the triangle 12 contains a texture coordinate (represented by the letters S and T) to reflect what portion of image to use. Or more importantly, a single triangle must lie completely within a single texture pattern.

Due to these requirements, it is necessary to decompose each triangle that references a large texture pattern into smaller triangles that lie completely within one of the smaller texture patterns.

Figure 2A:
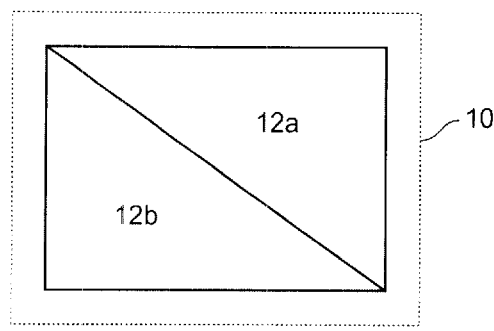
FIGS. 2A and 2B are diagrams depicting clipping triangles for a four-quadrant texture.
Figure 2B:
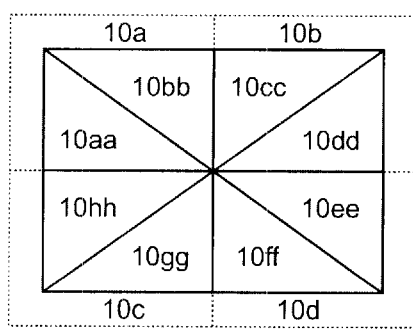

An example of triangle clipping is depicted in FIGS. 2A and B. FIG. 2A illustrates what the software developer would provide to apply a texture pattern 10 to two triangles 12a and b forming a square. The dotted lines represent the texture pattern and the solid lines are the triangles. If this were a large texture pattern that was subdivided into four pieces 10a–d; FIG. 2B illustrates the decomposition (clipping) of the triangles. The two triangles 12a and b that originally referenced the one large texture pattern 10 are now broken down into eight triangles 10aa–hh that reference the four smaller subdivided texture patterns 10a–d.

The key to this second step is to decompose the larger triangle into the smallest number of triangles to accomplish the task. The following paragraphs describe the technique used to decompose the triangles.

Figure 3:
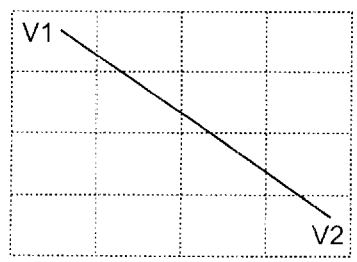
FIG. 3 is a diagram depicting one side of a triangle crossing several quadrants.

The triangle input for decomposition is defined by three vertices (corners) labeled V1, V2 and V3. Starting with V1 (it is a given that V1 is in one of the sub-divided pattern areas—known as a quadrant), the edges attached to V1 (defined by Vectors V1->V2 and V1->V3) are traversed and determine if the either of these edges crosses into another quadrant. This operation is depicted in FIG. 3 and is known as "limiting". The limiting process may generate new points that will be called V12 and V13. The important aspect of limiting, as illustrated here, is that this is not a simple intersection. A single edge may traverse more than one boundary point—it is imperative that the limiting function obtain the FIRST boundary crossing down the V1->V2 vector.

Now that both edges away from V1 have been limited the results are examined. There are three possibilities.

Both Edges Cross a Boundary

Figure 4:
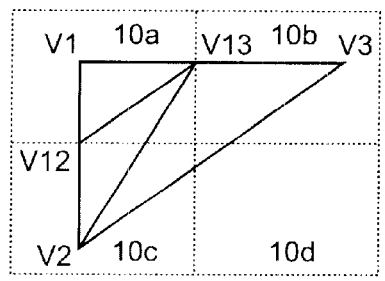
FIG. 4 is a diagram illustrating the decomposition process.

FIG. 4 depicts the case where both edges starting a single vertex cross a boundary. In this case, a triangle is picked off to draw and then the process continues with the remaining pieces. This is illustrated as follows in FIG. 4. The original triangle V1, V2, V3 is now broken down into three new triangles. Triangle V1, V12, V13 is uniquely in a quadrant and can be drawn; V12, V2, V13 is a new triangle that must be resubmitted for decomposition; and V2, V3, V13 will also be resubmitted for decomposition.

Single Edge Crossing

Single edges are handled in the same way as above— except those cases are held for last. In the single edge crossing case, the edge crossing is held for later and finding a double crossing is reattempted later based on using V2 as the root and then V3 as the root. By finding all double crossings first, the process will decompose the original triangle into the minimum number of small triangles.

No Crossing Found

Figure 5:
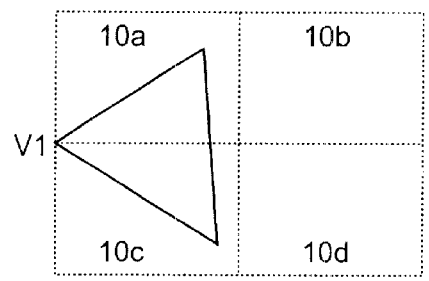
FIG. 5 is a diagram showing a triangle having a vertex on the border of a triangle.
Figure 6A:
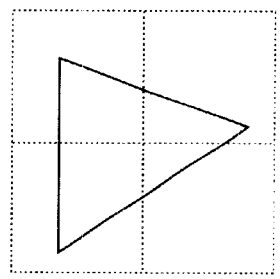
FIGS. 6A–L are a series of diagrams showing the process of clipping a triangle.
Figure 6B:
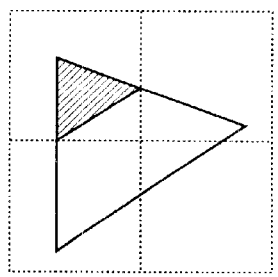
Figure 6C:
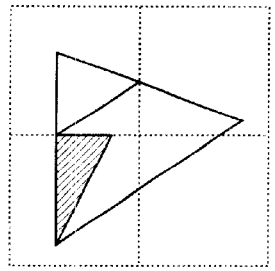
Figure 6D:
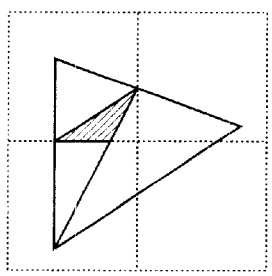
Figure 6E:
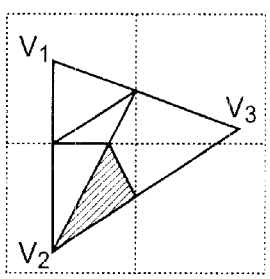
Figure 6F:
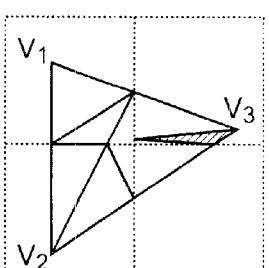
Figure 6G:
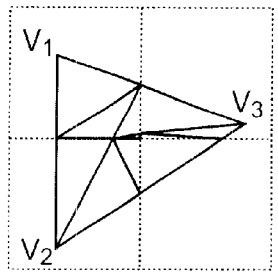
Figure 6H:
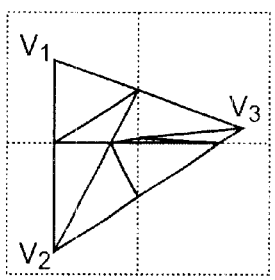
Figure 6I:
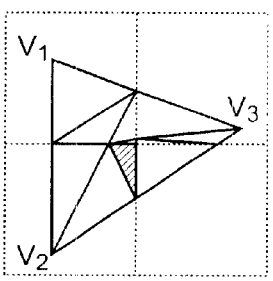
Figure 6J:
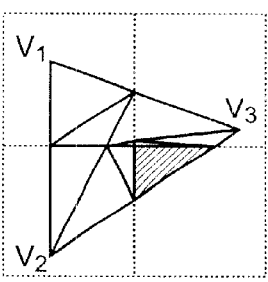
Figure 6K:
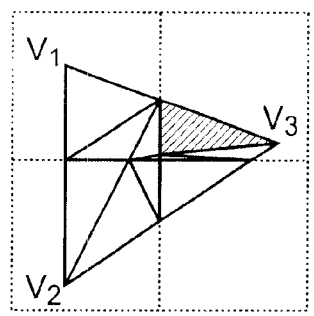
Figure 6L:
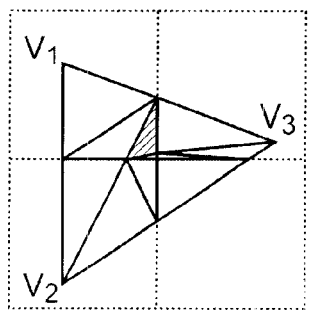

This is yet again another special case. On initial observation, it would appear that the entire triangle lies in one quadrant and can be drawn. Unfortunately, this is not the case, as the following illustration demonstrates. A degenerate case is where the initial vertex lies directly on an edge. This situation is depicted in FIG. 5. In this case, since V1 lies directly on the edges, there is no boundary crossing with either V2 or V3. But V2 and V3 both lie in different quadrants. This is possible because Vertex V1 actually lies in both quadrants—and if V1 were at the center of the image, it would lie in all four quadrants. Because of this degenerate case, the entire triangle is not considered in a single quadrant until no intersections are found using any of the three vertices as the root.

The Process

With the basics of the technique described, the entire decomposition process will now be presented in a pseudo-code fashion.

```
DecomposeTriangle (V1, V2, V3) {
    V12 = Limit(V1,V2)      //first crossing traversing edge from V1 to
                            //V2
    V13 = Limit(V1,V3)
    If (V12 and V13) {      //both crossings are found
        Draw (V1, V12, V13)
        DecomposeTriangle (V2, V13, V12)   //recursive call
        DecomposeTriangle (V2, V3, V13)
        Exit
    }
    V23 = Limit(V2,V3)
    V21 = Limit(V2,V1)
    If (V23 and V21) {
        Draw (V21, V2, V23)
        DecomposeTriangle (V3, V21, V23)
        DecomposeTriangle (V3, V2, V21)
        Exit
    }
    V31 = Limit(V3,V1)
    V32 = Limit(V3,V2)
    If (V31 and V32) {
        Draw (V31, V32, V3)
        DecomposeTriangle (V1, V32, V31)
        DecomposeTriangle (V1, V2, V32)
        Exit
    }
    If (V12) {              //only one crossing found
        Draw (V1, V12, V3)
        DecomposeTriangle (V12, V2, V3)
        Exit
    }
    If (V13) {
        Draw (V1, V2, V13)
        DecomposeTriangle (V13, V2, V3)
        Exit
    }
    If (V32) {
        Draw (V1, V32, V3)
        DecomposeTriangle (V32, V1, V2)
        Exit
    }
    Draw (V1, V2, V3);
}
```

Note that this is a recursive process for decomposition.

FIGS. 6A–6L depict the application of the process described by psuedo-code to the example of FIG. 4. Note that the decomposition process results in 11 clipped triangles, with each clipped triangle completely within one of the quadrants.

Figure 7:
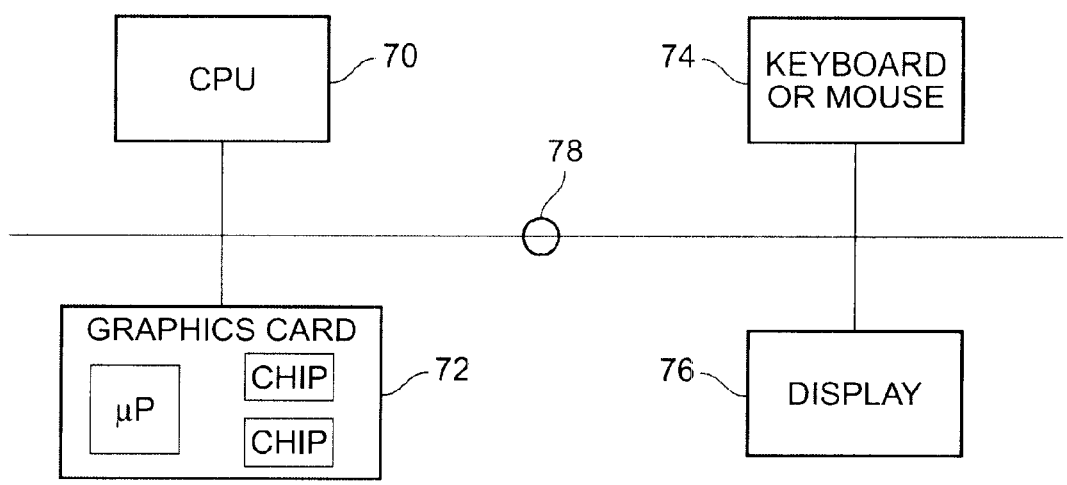
FIG. 7 is a block diagram of a system implementing the invention.

FIG. 7 depicts a preferred embodiment of a system for implementing the invention. In FIG. 7 a CPU 70, graphics card 72, keyboard or mouse input 74, and display 76, coupled together by a bus 78. The process is implemented by code store on the card and processed by an embedded core.

Thus, an application can use 512×512 texture patterns that will be processed by graphics chips with a native ability to handle only 256×256 texture patterns. Thus, enhanced performance is provided without the need to replace hardware.

The Implementation

The following is a listing of the file "TxrClip.c" which is used in a preferred embodiment of the invention. This file contains the actual implementation of the process applicable to the 3Dfx Voodoo™ Chips Sets contained within the Creative OpenGL Driver™. This implementation is limited to a single level implementation of 512×512 textures upon the 3Dfx hardware that is limited to 256×256 texture patterns.

```
#include <math.h>
#include "logger.h"
#include "globals.h"
#pragma warning ( disable : 4035
#pragma warning ( disable : 4273
/***********************************************************************
*****/
/**** Line Intersection Code
****/
/***********************************************************************
*****/
static void __Intersect ( float p, GrVertex *I, GrVertex *0, GrVertex *M
    M->x       = I ->x       + p*(0 ->x     - I ->x);
    M->y       = I ->y       + p*(0 ->y     - I ->y);
    M->z       = I ->z       + p*(0 ->z     - I ->z);
    M->w       = I ->w       + p*(0 ->w     - I ->w);
    M->r       = I ->r       + p*(0 ->r     - I ->r);
    M->g       = I ->g       + p*(0 ->g     - I ->g);
    M->b       = I ->b       + p*(0 ->b     - I ->b);
    M->a       = I ->a       + p*(0 ->a     - I ->a);
    M->sow0    = I ->sow0    + p* (0 ->sow0 - I ->sow0);
    M->tow0    = I ->tow0    + p* (0 ->tow0 - I ->tow0);
    M->sow1    = I ->sow1    + p* (0 ->sow1 - I ->sow1);
    M->tow1    = I ->tow1    + p* (0 ->tow1 - I ->tow1);
    M->Clip = CLIPPED;
}
/***********************************************************************
*****/
/**** Find Texture Limit along Vector
/***********************************************************************
*****/
static __inline float __LimitTexture   ( float ST1, float ST2
{
    int iTemp;
    float P, Limit, diff;
    diff = ST2 - ST1;
    if ( diff >0.001f ) {
        iTemp = (int) (2.0f * ST1) + 1;
        Limit = (float)iTemp / 2.0f;
        P = (Limit - ST1) / diff;
    } else if ( diff < -0.001f )  {
        iTemp = (int) ((2.0f * ST1) - 0.00001f)
        Limit = (float)iTemp / 2.0f;
P = (Limit - ST1) / diff;
    } else {
        P = -1.0;
    }
//LOG_DUMMY("          ", ("%0.2f, %0.2f --> P = %0.2f, Limit = %0.2f",ST1,ST2,P,Limit))
    return ( P );
}
/***********************************************************************
*****/
/***********************************************************************
*****/
/**** Clip the Triangle to Quad-Texture Space
****/
/***********************************************************************
*****/
/***********************************************************************
*****/
void FAR PASCAL __ClipTriangleTxr   ( GrVertex *In1, GrVertex *In2,
GrVertex *In3
{
    int __AT;
    int Quad;
    float w, P;
    float P12, P13;
    float P23, P21;
```

-continued

```
    float P31, P32;
    float BaseS, BaseT;
    float MidS, MidT;
    GrVertex New1, New2;
    GrVertex R1, R2, R3;
    GrVertex *V1, *V2, *V3;
/** Save a Unique Copy of the Points -- I Destroy them in this Process
**/
    memcpy ( &R1, In1, sizeof(GrVertex) );    V1 = &R1;
    memcpy ( &R2, In2, sizeof(Grvertex) );    V2 = &R2;
    memcpy ( &R3, In3, sizeof(Grvertex) );    V3 = &R3;
/** Insure points are in NDC Coordinates
**/
    if ( V1 ->Clip == 0 ) {
        V1 ->Clip = CLIPPED;
        V1->x     = V1->w * _Vp_SCL_IX * (V1->x - _VP_OFF_X);
        V1->y     = V1->w * _VP_SCL_IY * (V1->y - _VP_OFF_Y);
        w         = 1.0f / V1->oow;
        V1->sow0  = (w * V1->sow0) / _Active_S0_Scale;
        V1->tow0  = (w * V1->tow0) / _Active_T0_Scale;
        V1->sow1  = w * V1->sow1;
        V1->tow1  = w * V1->tow1;
    }
    if ( V2->Clip == 0 ) {
        V2->Clip  = CLIPPED;
        V2->x     = V2->w * _VP_SCL_IX * (V2->x - _VP_OFF_X);
        V2->y     = V2->w * _VP_SCL_IY * (V2->y - _VP_OFF_Y);
        w         = 1.0f / V2->oow;
        V2->sow0  = (w * V2->sow0) / _Active_S0_Scale;
        V2->tow0  = (w * V2->tow0) / _Active_T0_Scale;
        V2->sow1  = w * V2->sow1;
        V2->tow1  = w * V2->tow1;
    }
    if ( V3->Clip == 0 ) {
        V3->Clip  = CLIPPED;
        V3->x     = V3->w * _VP_SCL_IX * (V3->x - _VP_OFF_X);
        V3->y     = V3->w * _VP_SCL_IY * (V3->y - _VP_OFF_Y);
        w         = 1.0f / V3->oow;
        V3->sow0  = (w * V3->sow0) / _Active_S0_Scale;
        V3->tow0  = (w * V3->tow0) / _Active_T0_Scale;
        V3->sow1  = w * V3->sow1;
        V3->tow1  = w * V3->tow1;
    }
//LOG_DUMMY("_TxrClip",("START"));
//LOG_DUMMY("   ", ("%0.2f, %0.2f - %0.2f, %0.2f",V1->x,V1->y,V1-
>sow0,V1->tow0));
//LOG_DUMMY("   ", ("%0.2f, %0.2f - %0.2f, %0.2f",V2->x,V2->y,V2-
>sow0,V2->tow0) );
//LOG_DUMMY("   ", ("%0.2f, %0.2f - %0.2f, %0.2f",V3->x,V3->y,V3-
>sow0,V3->tow0))
/********
**/
/** Check for Clipping along the V1->V2 Vector and V1->V3 Vector
**/
/*******
**/
    P12 = 1.0f;
    P = __LimitTexture ( V1->sowo, V2->sow0 );
        if ( P > 0.00f && P < P12 ) P12 = P;
    P = _LimitTexture ( V1->tow0, V2->tow0 );
        if ( P > 0.00f && P < P12 ) P12 = P;
    P13 = 1.0f;
    P = _LimitTexture ( V1->sow0, V3->sow0 );
        if ( P > 0.00f && P < P13 ) P13 = P;
    P = _LimitTexture ( V1->tow0, V3->tow0 );
        if ( P > 0.00f && P < P13 ) P13 = P;
//LOG_DUMMY("          ", ("P12 = %0.2f - P13 = %0.2f",P12,P13));
    if ( P12 < 1.0f && P13 < 1.0f ) {
        _Intersect ( P12, V1, V2, &New1 );
        _Intersect ( P13, V1, V3, &New2 );
        _ClipTrianqleTxr ( V2, &New2, &New1 );
        _ClipTriangleTxr ( V2, V3, &New2 );
        V2 = &New1;
        V3 = &New2;
        qoto DRAW;
    }
/********
**/
/** Check for Clipping along the V2->V3 Vector and V2->V1 Vector
```

```
**/
/********
**/
    P23 = 1.0f;
    P = _LimitTexture ( V2->sow0, V3->sow0 );
        if ( P > 0.00f && P < P23 ) P23 = P;
    P = _LimitTexture ( V2->tow0, V3->tow0 );
        if ( P > 0.00f && P < P23 ) P23 = P;
    P21 = 1.0f;
    P = _LimitTexture ( V2->sow0, V1->sow0 );
        if ( P > 0.00f && P < P21 ) P21 = P;
    P = _LimitTexture ( V2->tow0, V1->tow0 );
        if( P > 0.00f && P < P21 ) P21 = P;
//LOG_DUMMY("           ", ("P23 = %0.2f - P21 = %0.2f",P23,P21));
    if ( P23 < 1.0f && P21 < 1.0f ) {
        _Intersect ( P23, V2, V3, &New1 );
        _Intersect ( P21, V2, V1, &New2 );
        _ClipTriangleTxr ( V3, &New2, &New1 );
        _ClipTriangleTxr ( V3, V1, &New2 );
        V1 = &New2;
        V3 = &New1;
        goto DRAW;
    }
/********
**/
/** Check for Clipping along the V3->V1 Vector and V3->V2 Vector
**/
/********
**/
    P31 = 1.0f;
    P = _LimitTexture ( V3->sow0, V1->sow0 );
        if ( P > 0.00f && P < P31 ) P31 = P;
    P = _LimitTexture ( V3->tow0, V1->tow0 );
        if ( P > 0.00f && P < P31 ) P31 = P;
    P32 = 1.0f;
    P = _LimitTexture ( V3->sow0, V2->sow0 );
        if ( P > 0.00f && P < P32 ) P32 = P;
    P = _LimitTexture ( V3->tow0, V2->tow0 );
        if ( P > 0.00f && P < P32 ) P32 = P;
//LOG_DUMMY("           ", ("P31 = %0.2f - P32 = %0.2f",P31,P32)
    if ( P31 < 1.0f && P32 < 1.0f ) {
        _Intersect ( P31, V3, V1, &New1 );
        _Intersect ( P32, V3, V2, &New2 );
        _ClipTriangleTxr ( V1, &New2, &New1 );
        _ClipTriangleTxr ( V1, V2, &New2 ) ;
        V1 = &New1;
        V2 = &New2;
        goto DRAW;
    }
/********
**/
/** Check for a Single Intersection Case (Corner Cases)
**/
/********
**/
    if ( P12 < 1.0f ) {
        _Intersect ( P12, V1, V2, &New1 );
        _ClipTriangleTxr ( &New1, V2, V3 );
        V2 = &New1;
        goto DRAW;
    }
    if ( P13 < 1.0f ) {
        _Intersect ( P13, V1, V3, &New2 );
        _ClipTriangleTxr ( &New2, V2, V3 );
        V3 = &New2;
        goto DRAW;
    }
    if ( P31 < 1.0f ) {
        _Intersect ( P31, V3, V1, &New1 )
        _ClipTriangleTxr ( &New1, V1, V2 );
        V1 = &New1;
        goto DRAW;
    }
    if ( P32 < 1 of ) {
        _Intersect ( P32, V3, V2, &New2 );
        _ClipTriangleTxr ( &New2, V1, V2 );
        V2 = &New2;
    }
/******
```

-continued

```
**/
/** Determine what Quadrant the Triangle is In
**/
/********
**/
DRAW:
    MidS = 0.3333333f * (V1->sow0 + V2->sow0 + V3->sow0);
    MidT = 0.3333333f * (V1->tow0 + V2->tow0 + V3->tow0);
    BaseS = (float)fmod(MidS,1.0);
    BaseT = (float)ftnod(MidT,1.0);
    if ( BaseT <= 0.50f ) {
        if ( BaseS <= 0.50f )    Quad = 0;
        else                     Quad = 1;
        }else {
        if ( BaseS <= 0.50f )    Quad = 2;
        else                     Quad = 3;
        }
/** Adjust to Texture Coordinates for the Correct Quad
**/
    BaseS = (float)floor(MidS);
    BaseT = (float)floor(MidT);
    switch ( Quad ) {
        case 1: BaseS += 0.50f;                     break;
        case 2: BaseT += 0.50f;                     break;
        case 3: BaseS += 0.50f; BaseT += 0.50f;     break;
    }
    V1->sow0 = 2.0f * (V1->sow0 - BaseS);
    V2->sow0 = 2.0f * (V2->sow0 - BaseS);
    V3->sow0 = 2.0f * (V3->sow0 - BaseS);
    V1->tow0 = 2.0f * (V1->tow0 - BaseT);
    V2->tow0 = 2.0f * (V2->tow0 - BaseT);
    V3->tow0 = 2.0f * (V3->tow0 - BaseT);
/********
**/
/** Convert Points to Screen Space and Draw the Triangle
**/
/********
**/
//LOG_DUMMY("_TxrClip",("Draw Triangle in Quad %d",Quad));
//LOG_DUMMY("   ", ("%0.2f, %0.2f - %0.2f, %0.2f",V1->x,V1->y,V1->sow0,V1->tow0)
//LOG_DUMMY("   ", ("%0.2f, %0.2f - %0.2f, %0.2f",V2->x,V2->y,V2->sow0,V2->tow0)
//LOG_DUMMY("   ", ("%0.2f, %0.2f - %0.2f, %0.2f",V3->x,V3->y,V3->sow0,V3->tow0)
    V1->oow  = 1.0f / V1->w;
    V1->x    = ( V1->oow * V1->x * _VP_SCL_X ) + _VP_OFF_X;
    V1->y    = ( V1->oow * V1->y * _VP_SCL_Y ) + _VP_OFF_Y;
    V1->oow  = 1.0f / ((V1->w * VP SCL_z) + _VP_OFF_Z);
    V1->sow0 = V1->oow * V1->sow0 * _Active_S0_Scale;
    V1->tow0 = V1->oow * V1->tow0 * _Active_T0_Scale;
    V1->sow1 = V1->oow * V1->sow1;
    V1->tow1 = V1->oow * V1->tow1;
    V2->oow  = 1.0f / V2->w;
    V2->x    = ( V2->oow * V2->x * _VP_SCL_X ) + _VP_OFF_X;
    V2->y    = ( V2->oow * V2->y * _VP_SCL_Y ) + _VP_OFF_Y;
    V2->oow  = 1.0f / ((V2->w * _VP_SCL_Z) + _VP_OFF_Z);
    V2->sow0 = V2->oow * V2->sow0 * _Active_S0_Scale;
    V2->tow0 = V2->oow * V2->tow0 * _Active_T0_Scale;
    V2->sow1 = V2->oow * V2->sow1;
    V2->tow1 = V2->oow * V2->tow1;
    V3->oow  = 1.0f / V3->w;
    V3->x    = ( V3->oow * V3->x * _VP_SCL_X ) + _VP_OFF_X;
    V3->y    = ( V3->oow * V3->y * _VP_SCL_Y ) + _VP_OFF_Y;
    V3->oow  = 1.0f / ((V3->w * _VP_SCL_Z) + _VP_OFF_Z);
    V3->sow0 = V3->oow * V3->sow0 * _Active_S0_Scale;
    V3->tow0 = V3->oow * V3->tow0 * _Active_T0_Scale;
    V3->sow1 = V3->oow * V3->sow1;
    V3->tow1 = V3->oow * V3->tow1;
/********
**/
/** Make sure the correct Texture Quadrant is Mapped in
**/
/********
**/
    if ( _STATE_TEXTURE_QUAD !32 Quad ) {
        _STATE_TEXTURE_QUAD = Quad;
        _AT = __ACTIVE_TEXTURE[0];
        switch ( Quad ) {
```

```
                case 0:   (* __LPFNgrTexSource) ( GR_TMU0,
__TEXTURE[_AT].CacheAddr[0] [0], GR_MIPMAPLEVELMASK_BOTH,
&_TEXTURE[_AT].Info );     break;
                case 1: (* __LpFNgrTexSource) ( GR_TMU0,
__TEXTURE[_AT].CacheAddr[0] [1], GR_MIPMAPLEVELMASK_BOTH,
&_TEXTURE[_AT].Info2 );     break;
                case 2:     (* __LPFNgrTexsource) ( GR_TMU0,
__TEXTURE[_AT].CacheAddr[0] [2], GR_MIPMAPLEVELMASK_BOTH,
&_TEXTURE[_AT].Info3 );     break;
                case 3:     (* __LpFNgrTexsource) ( GR_TMU0,
__TEXTURE[_AT].CacheAddr[0] [3], GR_MIPMAPLEVELMASK_BOTH,
&_TEXTURE[_AT].Info4 );     break;
            }
        }
/** Draw the Triangle
**/
    (* __LPFNgrDraWTriangle) ( V1, V2, V3 );
/** Draw the Triangle Outline
**/
#if 0
    if ( _TRAP_F11 ) {
        GrState State;
        (* __LPFNgrGlideGetstate) (&State) ;
        (* __LPFNgrAlphaBlendFunction) ( GR_BLEND_ONE, GR_BLEND_ZERO;
GR_BLEND_ONE, GR_BLEND_ZERO );
            (* ___LPFNgrAlphaCombine) (  GR_COMBINE_FUNCTI0N_SCALE_OTHER,
                                        GR_COMBINE_FACTOR_ONE,
                                        GR_COMBINE_LOCAL_NONE,
                                        GR_COMBINE_OTHER_NONE, FXFALSE );
            (* __LPFNgrColorCombine) (  GR_COMBINE_FUNCTION_LOCAL,
                                        GR_COMBINE_FACTOR_ONE,
                                        GR_COMBINE_LOCAL_ITERATED,
                                        GR_COMBINE_OTHER_NONE, FXFALSE );
        (* __LPFNgrTexCombine) ( GR_TMU0,
                                 GR_COMBINE_FUNCTION_ZERO,
GR_COMBINE_FACTOR_ZERO,
                                 GR_COMBINE_FUNCTION_ZERO,
GR_COMBINE_FACTOR_ZERO,
                                 FXFALSE, FXFALSE );
        V1->r = 255.0;
        V1->g = 255.0;
        V1->b = 255.0;
        V1->a = 255.0;
        V2->r = 255.0;
        V2->g = 255.0;
        V2->b = 255.0;
        V2->a = 25S.0;
        V3->r = 255.0;
        V3->g = 255.0;
        V3->b = 255.0;
        V3->a = 255.0;
        (* __LPFNgrDrawLine) ( V1, V2 );
        (* __LPFNgrDrawLine) ( V2, V3 );
        (* __LPFNgrDrawLine) ( V3, V1 );
        (* __LPFNgrGlideSetstate) (&State)
    }
#endif
}
```

The invention has now been described with reference to the preferred embodiments. Alternatives and substitutions will now be apparent to persons of skill in the art. In particular, although the examples only show four quadrant dividing of a texture pattern, the patterns may be further divided according to the power of two rule. Additionally, the technique can be used to enhance the performance of chips having native capacity greater than 256×256. Further, alternatives to the process disclosed will be now be apparent to persons of skill in the art. Accordingly, it is not intended to limit the invention except as provided by the appended claims.

What is claimed is:

1. A method for supporting texture patterns larger than supported natively by a graphics chip, with a texture pattern mapped onto an object defined as connected triangles, said method comprising the steps of:

breaking down the texture pattern into N quadrants, where N is a power of 2 and each quadrant is of a size supported natively by the graphics chip;

receiving an object triangle onto which the texture pattern is to be mapped;

if the object triangle does not completely fit within a quadrant, decomposing the object triangle into clipped triangles, where each clipped triangle fits completely into a quadrant; and if the object triangle completely fits within a quadrant, mapping the texture pattern onto the object triangle, else, mapping the texture pattern to the clipped triangles.

2. The method of claim 1 where said step of decomposing the object triangle comprises the steps of:

(a) selecting one vertex of the input triangle as a selected vertex;

(b) determining whether each of the two sides of the object triangle that converge at the selected vertex extends outside a first quadrant containing the selected vertex;

(c) if both of the two sides of the input triangle that converge at the selected vertex extend outside the first quadrant, then performing the following further steps:
  (i) outputting a clipped triangle whose vertices are the selected vertex (V1), a first intersection point (V12) closest to V1 at which the side extending from V1 to a second vertex (V2) of the input triangle intersects a boundary between the first quadrant and another quadrant, and a second intersection point (V13) closest to V1 at which the side extending from V1 to a third vertex (V3) of the input triangle intersects a boundary between quadrants;
  (ii) decomposing, according to steps (a–c), a triangle whose vertices are the points V2, V12 and V13;
  (iii) decomposing, according to steps (a–c), a triangle whose vertices are the points V2, V3, and V13;

(d) or else if only one of the two sides that converge at the selected vertex extends outside the quadrant containing the selected vertex, then repeating steps (b) and (c) using each of the other two vertices as the selected vertex;

(e) if steps (a–d) do not result in finding any vertex for which both of the two sides that converge at said vertex extend outside the boundary containing said vertex, then selecting the selected vertex selected in step (a) again and proceeding according to the following steps:
  (i) determining whether one of the two sides that converge at the selected vertex extends outside a selected quadrant containing the selected vertex;
  (ii) if one of the two sides that converge at the selected vertex extends outside the selected quadrant containing the selected vertex, then performing the following further steps:
    (A) outputting a clipped triangle whose vertices are the selected vertex (V1), a second vertex of the input triangle that, with V1, defines the side that does not extend beyond the selected quadrant containing V1 (V2), and a third intersection point (V13) closest to V1 at which the side extending from V1 to a third vertex of the input triangle intersects a boundary;
    (B) decomposing, according to steps (a–c), a triangle whose vertices are V2, V13, and the third vertex of the input triangle;
  (iii) if neither of the two sides that converge at the selected vertex extends outside the quadrant containing the selected vertex, repeat steps (i) and (ii) using each of the other two vertices as the selected vertex;

(g) if no side is found to extend beyond any boundary in steps (a–f), then outputting the input triangle as a clipped triangle.

3. A system for supporting texture patterns larger than supported natively by a graphics chip, with a texture pattern mapped onto an object defined as connected triangles, said system comprising:

a graphics card including graphics chips supporting texture patterns of a fixed size;

a display;

a CPU;

a bus coupling the cpu, graphics card, and display;

with said CPU configured to:

break down the texture pattern into N quadrants, where N is a power of 2 and each quadrant is of a size supported natively by the graphics chip;

receive an object triangle onto which the texture pattern is to be mapped;

if the object triangle does not completely fit within a quadrant, decompose the object triangle into clipped triangles, where each clipped triangle fits completely into a quadrant; and map the texture pattern onto the object triangle if the object triangle completely fits within a quadrant or the clipped triangles.

4. A computer program product for supporting texture patterns larger than supported natively by a graphics chip, with a texture pattern mapped onto an object defined as connected triangles, said computer program product comprising:

a computer readable storage structure having computer readable program code embodied therein, said computer readable program code comprising:

computer readable program code for breaking down the texture pattern into N quadrants, where N is a power of 2 and each quadrant is of a size supported natively by the graphics chip;

computer readable program code for receiving an object triangle onto which the texture pattern is to be mapped;

computer readable program code for determining if the object triangle does not completely fit within a quadrant, and, if so for decomposing the object triangle into clipped triangles, where each clipped triangle fits completely into a quadrant; and computer readable program code for determining if the object triangle completely fits within a quadrant, and if so for mapping the texture pattern onto the object triangle, else, mapping the texture pattern to the clipped triangles.

* * * * *